United States Patent
Varcus

(10) Patent No.: US 10,703,234 B2
(45) Date of Patent: Jul. 7, 2020

(54) SEAT CARRIER FOR A VEHICLE SEAT

(71) Applicant: Ford Global Technologies, LLC, Dearborn, MI (US)

(72) Inventor: Johannes A. Varcus, Sprockhoevel/NRW (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/874,833

(22) Filed: Jan. 18, 2018

(65) Prior Publication Data

US 2018/0215290 A1 Aug. 2, 2018

(30) Foreign Application Priority Data

Jan. 27, 2017 (DE) .................. 10 2017 201 356

(51) Int. Cl.
| | |
|---|---|
| *B60N 2/42* | (2006.01) |
| *B60N 2/06* | (2006.01) |
| *B60N 2/427* | (2006.01) |
| *B60N 2/015* | (2006.01) |

(52) U.S. Cl.
CPC ........... *B60N 2/4249* (2013.01); *B60N 2/015* (2013.01); *B60N 2/06* (2013.01); *B60N 2/42709* (2013.01)

(58) Field of Classification Search
CPC ... B60N 2/4249; B60N 2/42709; B60N 2/015
See application file for complete search history.

(56) References Cited

U.S. PATENT DOCUMENTS

| | | | | |
|---|---|---|---|---|
| 3,724,603 A  * | 4/1973 | Shiomi | ................ | B60N 2/4228 188/371 |
| 5,967,604 A  * | 10/1999 | Yoshida | ............... | B60N 2/4221 248/429 |
| 8,714,642 B2 * | 5/2014 | Lamparter | ............... | B60N 2/24 297/216.1 |
| 9,994,124 B2 * | 6/2018 | Nagata | ................... | B60N 2/015 |
| 2013/0038098 A1* | 2/2013 | Maier | .................... | B60N 2/682 297/216.1 |

(Continued)

FOREIGN PATENT DOCUMENTS

| | | |
|---|---|---|
| DE | 10033340 C1 | 10/2001 |
| DE | 102009002377 A1 | 10/2010 |

(Continued)

OTHER PUBLICATIONS

German Examination Report dated Nov. 10, 2017 re: Appl. No. DE 102017201356.7.

*Primary Examiner* — Philip F Gabler
(74) *Attorney, Agent, or Firm* — Frank A. MacKenzie; Bejin Bieneman PLC

(57) ABSTRACT

The invention relates to a seat carrier for a vehicle seat having a position displacement device for the vehicle seat, which is secured to at least one transverse seat carrier which is arranged on the base of the vehicle, and having a deformation device which is arranged between the position displacement device and the transverse seat carrier and which absorbs by means of deformation catapult movements of vehicle occupants which occur in the event of a collision. It is proposed that at least one crashbox be provided between the position displacement device and the transverse seat carrier as a deformation device.

17 Claims, 2 Drawing Sheets

(56) References Cited

U.S. PATENT DOCUMENTS

2014/0332656 A1* 11/2014 Maurer ................ B60N 2/0722
248/548
2016/0207427 A1 7/2016 Wang
2018/0126878 A1* 5/2018 Yamada ............. B60N 2/42709

FOREIGN PATENT DOCUMENTS

DE 102011010992 A1 8/2012
DE 102012218722 A1 4/2014

* cited by examiner

SEAT CARRIER FOR A VEHICLE SEAT

CROSS-REFERENCE TO RELATED APPLICATIONS

This application claims priority to and all benefits of German patent application 102017201356.7 filed on Jan. 27, 2017, entitled "Seat carrier for a vehicle seat," the contents of which are hereby incorporated herein by reference in their entirety.

BACKGROUND

Currently, in the development of motor vehicles, the emphasis is increasingly placed on providing vehicles which are constructed in such a manner that occupants are injured as little as possible in the event of a crash.

To this end, there are provided in particular on the vehicle seats energy-absorbing devices which in the event of a collision give way to the collision impulse in a controlled manner and by absorbing energy.

WO 2013/090744 A1 discloses an energy-absorbing system for a vehicle seat. The system comprises a shearing element which couples a seat portion to a base structure of a vehicle. The shearing element is configured in such a manner that it withstands a first load without breaking. In the event of a second load which is greater than the first load, there is a non-resilient deformation of the shearing element. There is further connected to the seat portion and the base structure an energy absorber which is constructed in such a manner that it can absorb the energy which follows the deformation of the shearing element.

DE 10 2009 002 377 A1 proposes a side impact protection device for a vehicle which has a receiving device which is constructed to absorb a force applied laterally to the vehicle as a result of a side impact. Furthermore, a first coupling device is provided to afford a coupling possibility between the receiving device and a vehicle seat so that the vehicle seat can be displaced by the force from a normal position into the inner side of the vehicle. A second coupling device is provided to afford a coupling possibility between the receiving device and an absorber element when the vehicle seat is located in the normal position so that the force from the absorber element can be absorbed.

US 2016/0207427 A1 discloses an energy absorption device for a child's car seat which comprises a seat member and a base, wherein the seat member is arranged in a sliding manner on the base. On the base a limitation block is further arranged in front of the path along which the seat member slides relative to the base. Furthermore, in order to absorb and buffer impacts, there are arranged between the limitation block and the seat member absorption materials which become deformed when the seat member in the event of a collision or in the event of braking slides as a result of inertia relative to the base forward to the limitation block.

EP 2 662 238 A1 discloses a vehicle seat carrier for a vehicle seat having a position adjustment device which is constructed to displace the vehicle seat carrier between a large number of different positions and a position locking of the vehicle seat carrier at a selected position. Furthermore, the position locking is constructed so as to be deactivated in the event of a detected crash or so that it is deactivated in the event of a detected imminent crash so that the vehicle seat carrier is displaced at least partially by the position adjustment device in a defined manner along a first path in order in this manner to provide an occupant protection function.

DE 10 2012 218 722 A1 discloses a vehicle seat delay unit which has a deformation element which is secured to a vehicle seat of a vehicle. Furthermore, the vehicle seat delay unit has a deformation unit which is constructed for deformation of the deformation element and which is secured to a seat rail which is constructed to guide the vehicle seat, wherein the deformation unit is further constructed to deform the deformation element when the deformation element moves in a main extent direction of the seat rail.

JP 2015-214204 A discloses a passenger seat for an aircraft having a deformation element which is deformed in the event of a force which is directed forward. Furthermore, shock-absorbing structures are provided in the legs of the passenger seat.

All the above-described energy-absorbing devices for vehicle seats known from the prior art have the disadvantage that their structure is very complex and thus require modifications of the internal seat structure.

DETAILED DESCRIPTION

Figure 1:
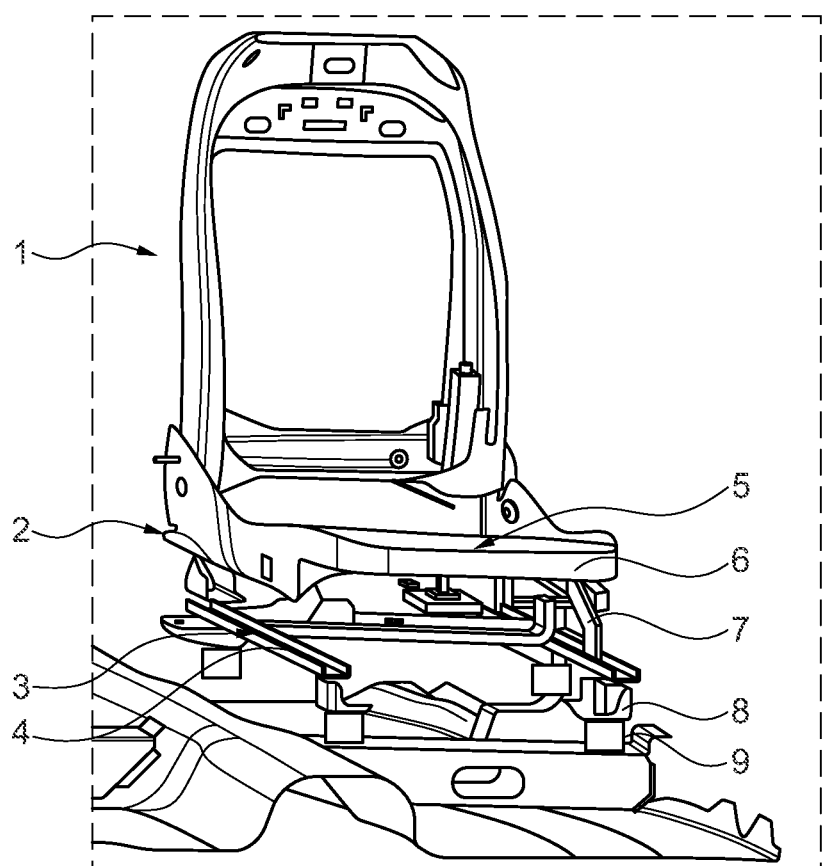
FIG. 1 is a perspective view of a vehicle seat with an example a seat carrier.

An object of the present disclosure is to provide a seat carrier for a vehicle seat having an energy-absorbing device which can be integrated in the vehicle carrier in a simple manner without complex modifications of the internal seat structure being required.

According to the disclosure, the object is achieved with a seat carrier for a vehicle seat described below.

It should be noted that the features and measures set out individually in the following description can be combined with each other in any technically advantageous manner and set out other embodiments of the disclosure. The description additionally characterizes and specifies the seat carrier in particular in connection with the Figures.

A seat carrier has a position displacement device for a vehicle seat which is secured to at least one transverse seat carrier which is arranged on a base of the vehicle and a deformation device which is arranged between the position displacement device and the transverse seat carrier and which absorbs by means of deformation catapult movements of vehicle occupants which occur in the event of a collision, in particular in the event of a front-end collision. At least one crashbox is provided as a deformation device between the position displacement device and the transverse seat carrier.

At least one crashbox can advantageously be used as an energy-absorbing device between the position displacement device and the transverse seat carrier. Crashboxes afford the advantage of having a simple structure, they are relatively cost-effective and easy to integrate without complex modifications being required in the seat structure The crashbox can be constructed in such a manner that it can absorb a defined deformation energy from the catapult movement. A defined deformation of the crashbox is achieved by the crashbox having an extruded profile with a rectangular cross-section, wherein the upper side and the lower side of the crashbox are constructed in a planar manner and are used for securing to the position displacement device or the transverse seat carrier, wherein there are provided desired deformation regions defined on the side walls. Furthermore, the crashbox is constructed to be open at both sides in the longitudinal direction of the vehicle, that is to say, arranged with the open cross-section thereof in the direction of any catapult movement. The described embodiment enables the side walls of the crashbox which extend in the longitudinal vehicle direction to become deformed by means of folding or the like in the event of a collision and to absorb the collision impulse which occurs in this case. A collision in the context of this disclosure is any collision, that is to say, a side collision, a front-end collision, etc.

The crashbox may also be composed with the separately produced walls thereof in such a manner that an open profile is formed. This enables a particularly large degree of freedom in terms of configuration with regard to a contraction of the crashbox at the side walls thereof, but which is also produced with the embodiment as an extruded profile. It is conceivable to produce the crashbox from any suitable material, that is to say, not only from sheet steel, but also from light metals or plastics materials, and also fiber-reinforced plastics materials.

In known vehicle seat carriers, the position displacement device is secured to two transverse seat carriers by means of two seat bases. In one embodiment, a crashbox is arranged between each seat base and the transverse seat carrier. This embodiment affords the advantage that the known seat carriers do not have to be modified since the crashboxes can be integrated in a simple manner between the seat bases and the transverse seat carriers. Furthermore, it is advantageous that, unlike in the known deformation devices, in the event a collision the deformed crashboxes can be replaced in a simple and cost-effective manner.

According to other embodiments according to the disclosure, the seat bases and/or the transverse seat carriers may have collision-absorbing properties, whereby the absorption of forces which occur in the event of a collision can be further improved.

In the different Figures, identical components are always given the same reference numerals, for which reason they are generally also only described once.

FIG. 1 shows a vehicle seat 1 having a seat carrier 2. The seat carrier 2 allows for displacement of the vehicle seat 1 by a vehicle occupant via a position displacement device 3 which has two seat rails 4 which extend parallel with each other. At four corners of a framework 6 which forms the seat face 5 there are arranged in each case support elements 7 whose lower ends are constructed in such a manner that they can be arranged so as to be able to be displaced in the seat rails 4. Seat bases 8 are arranged below the seat rails 4. The seat bases 8 are secured to the transverse seat carriers 10 with crashboxes 9.

Figure 2:
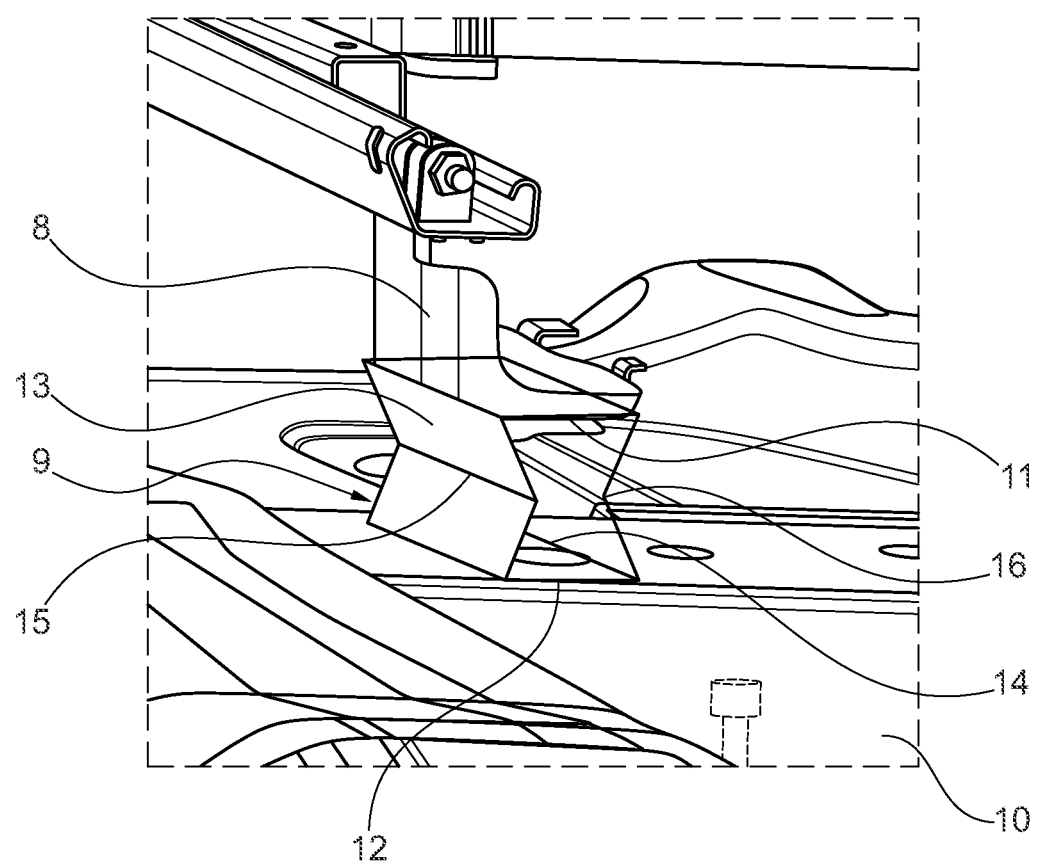
FIG. 2 is a perspective view of securing a position displacement device with a seat base to the seat carrier of FIG. 1 with a crashbox.

In FIG. 2, an embodiment of a crashbox 9 according to the disclosure is illustrated in particular detail.

The crashbox 9 has an extruded profile with a rectangular cross-section. The crashbox 9 has an upper wall 11, a lower wall 12 and side walls 13, 14 which are arranged therebetween. The upper and lower walls 11 and 12 are constructed to be planar in their extent and extend in an assembled position in the longitudinal direction of the vehicle which also applies to the side walls 13, 14. The crashbox 9 is open at the end faces thereof, for example, completely open. The seat base 8 is secured to the upper wall 11. The transverse seat carrier 10 is secured to the lower wall 12 of the crashbox 9. The side walls 13, 14 each have a contraction which is orientated in the direction of a center axis. This means that the side walls 13 and 14 are inclined inward from the upper wall 11 in the direction toward the lower wall 12 initially in the direction toward the center axis in order to then be directed further in a state inclined outward in the direction toward the lower wall 12. In this case, the upper portions of the side walls 13 and 14 taper toward each other in a dovetail-like manner, whilst the lower portions expand again in a dovetail-like manner. There are thus formed desired deformation regions 15, 16 of the crashbox 9 which ensure that the crashbox 9 in the event of a collision folds together in a defined manner in this region.

In FIG. 2, the contraction is arranged at half of a crashbox height. It is naturally also possible to provide the narrowest region closer to the upper or lower wall 11 or 12 so that the crashbox is non-symmetrical.

List of Reference Numerals:
1. Vehicle seat
2. Seat carrier
3. Position displacement device
4. Seat rail
5. Seat face
6. Framework for seat face
7. Support elements
8. Seat base
9. Crashbox
10. Transverse seat carrier
11. Upper wall of the crashbox
12. Lower wall of the crashbox
13. Side wall of the crashbox
14. Side wall of the crashbox
15. Deformation region of the crashbox
16. Deformation region of the crashbox

The invention claimed is:

1. A seat carrier assembly, comprising:
a transverse seat carrier elongated along a cross-vehicle axis;
a position displacement device secured to the transverse seat carrier; and
a crashbox designed to deform in the event of a collision, the crashbox having an upper wall and a lower wall, the upper wall fixed to the position displacement device and the lower wall fixed to the transverse seat carrier, the crashbox arranged between the position displacement device and the transverse seat carrier, and the crashbox having a pair of side walls extending between the upper wall and the lower wall, each of the side walls including a contraction, the contraction elongated in a direction perpendicular to the cross-vehicle axis.

2. The seat carrier assembly of claim 1, wherein deformation of the crashbox absorbs a threshold amount of energy.

3. The seat carrier assembly of claim 1, wherein each of the side walls defines a deformation region.

4. The seat carrier assembly of claim 1, wherein the each of the side walls includes an upper portion extending from the upper wall and toward each other, and a lower portion extending from the lower wall and toward each other.

5. The seat carrier assembly of claim 1, wherein the crashbox is open in a vehicle longitudinal direction.

6. The seat carrier assembly of claim 1, further comprising a second crashbox secured to the displacement device.

7. The seat carrier assembly of claim 6, further comprising a first seat base securing the crashbox to the displacement device, and a second seat base securing the second crashbox to the displacement device.

8. The seat carrier assembly of claim 7, wherein the first seat base and the second seat base each have collision-absorbing properties.

9. The seat carrier assembly of claim 1, wherein the transverse seat carrier has collision-absorbing properties.

10. The seat carrier assembly of claim 1, wherein the side walls are spaced from each other along the cross-vehicle axis.

11. The seat carrier assembly of claim 10, wherein spacing of the sidewalls from each other defines a hollow.

12. The seat carrier assembly of claim 11, wherein the hollow is open at ends spaced from each other perpendicular to the cross-vehicle axis.

13. The seat carrier assembly of claim 12, wherein each of the side walls includes an upper portion extending from the upper wall and toward each other, and a lower portion extending from the lower wall and toward each other.

14. The seat carrier assembly of claim 13, wherein the upper portions abut the lower portions at the contraction.

15. The seat carrier assembly of claim 14, wherein the upper portions extend transversely from the upper wall to the contraction, and the lower portions extend transversely from the lower wall to the contraction.

16. The seat carrier assembly of claim 15, wherein the lower portions are closer to each other at the contraction than at the upper wall and the upper portions are closer to each other at the upper wall than at the contraction.

17. The seat carrier assembly of claim 16, wherein the upper portions and the lower portions are elongated perpendicular to the cross-vehicle axis.

\* \* \* \* \*